Sept. 3, 1963            A. MAURER            3,102,431

V-BELT PULLEY VARIABLE TRANSMISSION

Filed March 31, 1961            2 Sheets-Sheet 1

INVENTOR.
ALBRECHT MAURER
BY Jacob L. Kollin
ATTORNEY

Sept. 3, 1963    A. MAURER    3,102,431
V-BELT PULLEY VARIABLE TRANSMISSION
Filed March 31, 1961    2 Sheets-Sheet 2

INVENTOR.
ALBRECHT MAURER
BY
Jacob L. Kollin
ATTORNEY 3,102,431
V-BELT PULLEY VARIABLE TRANSMISSION
Albrecht Maurer, Holderlinweg 18,
Bad Homburg, Germany
Filed Mar. 31, 1961, Ser. No. 99,775
Claims priority, application Germany Apr. 12, 1960
4 Claims. (Cl. 74—230.17)

In the construction of V-belt pulley change speed drives, in which a wedge-shaped or V-belt traveling between a pair of wedge-shaped flanges of the driven shaft transmits the motive force to another pair of drive flanges and thus drives their associated shaft, there are encountered difficulties in connection with machine and drive housing installations. These difficulties sometimes reside in that the oppositely disposed bearing locations of both shafts and the control linkage must be accurately aligned, this alignment being made possible only by drilling the oppositely disposed bores together and by employing dowel pins to secure the housing parts against displacement. Furthermore, the accuracy of the assembly can only be controlled after the drive is installed in the corresponding machine. Additional difficulties are further occasioned in installations in machine housings due to the frequent necessity of providing several bores which must be arranged at accurate relative locations. The known V-belt pulley variable transmissions suffer further from a considerable running noise and from the development of heat associated with internal energy losses.

The invention overcomes the above described disadvantages, in particular with relation to the construction and installation difficulties.

According to the invention, all drive parts which serve to transmit power, adjustment and change of rotational speed in the V-belt variable transmission, are arranged in a pan-like carrier wall and the bearings which support the shaft ends opposite this carrier wall are supported in a plate which is parallel to the carrier wall and is connected with the carrier wall by means of a transverse extending within the endless V-belt. Furthermore all the drive parts which serve to transmit power and to change the rate of revolutions are disposed within the space surrounded by the V-belt.

In this manner the assembled V-belt pulley variable speed drive constitutes a constructional unit ready for mounting, at the source of manufacture, and which may be installed in, or fitted to, any desired machine without any difficulty by simply connecting the end of the driven shaft or of the drive shaft of the unit with the drive shaft end of the particular machine in a desired manner, for example, by means of a connecting sleeve. It is then only necessary to secure the carrier wall to the particular machine with a sufficient number of screws or similar fastening means, for example, about the edge of the provided installation opening. At the same time it is unimportant whether the mounting unit consists of an enclosed housing with a second pan already provided by the manufacturer and is then installed in or fitted in a machine with this second pan, or if the machine is provided with a corresponding housing part which may provide, with the unit's carrier wall, an enclosed oil-tight housing after the installation or attachment. In this manner, all the parts of the V-belt pulley change speed drive are assembled by the manufacturer in an economical manner with the desired precision, as an easily manipulated and well-accessible unit, thereby facilitating the installation or attachment in every infinitely variable installation or machine decided upon.

Of further significance is the fact that all the drive parts employed in the power transmission and in the change of the number of revolutions are disposed in the space enclosed by the V-belt. It is thereby possible to employ, without any further complications, an endless V-belt. In order to permit the replacement of the latter, when required, it is only necessary to loosen the securing screws, or the like, with which the construction unit according to the invention is attached to the particular machine and then to remove it together with the rear wall. The V-belt is now accessible without any further complication and may be taken off over the drive pulley pair. Should a similar replacement V-belt variable transmission drive be available in the stockroom, it is only necessary to screw on the replacement unit with its carrier wall, in the place of the dismounted drive and the particular machine is again ready for operation. In this manner machine time losses may be reduced to a minimum.

The arrangement of parts at the carrier wall according to the invention necessitates the reconstruction of the drive parts which serve to transmit power, to adjust and to change the number of revolutions.

Advantageously, the traverse which connects the carrier wall and the plate parallel thereto consists of two spaced round rods which are arranged parallel to the drive shafts. The rods form guides for the shiftable dog which provides simultaneously and uniformly the axial displacement of both diagonally opposed, axially adjustable drive flanges against the drive flanges of both drive pulley pairs which are non-rotatably secured to the drive shafts.

This type of traverse construction results, in addition, in a particularly rigid twist-staying union between the carrier wall and the plate.

Furthermore, the control member for shifting the shiftable dog in a direction perpendicular to the axis of the drive shafts is arranged directly on the carrier wall.

The shiftable dog consists advantageously of a displaceable carrier member arranged between the drive flange pairs and which is parallel to the drive flange shafts, with two swingable fork-like brackets which are disposed in opposite directions relative to the plane of the driveshaft axes and which are axially perpendicular thereto. In these brackets are simultaneously supported swinging members which are also perpendicular to the axes of the fork-like brackets, which provide an element or support for the housing of the thrust bearings, which are disposed directly or indirectly against the axially adjustable drive flanges.

A lever connected with the movable bracket is advantageously employed as a control member for shifting or setting the bracket. The lever is advantageously supported on a rotatable sleeve which is supported in a recess of the carrier wall and which may be rotated from without with the aid of an adjusting knob or the like. A planetary pinion drive is advantageously provided for performing the rotary movement. The internal fixed gear of the planetary pinion drive is coupled with the shaft of the adjusting knob and a rotatable planetary pinion is mounted on a rotor disk mounted on a shaft which is eccentric to the axis of the internal gear and which rolls about the internal gear and projects past its width when the adjusting knob is rotated. The teeth of the rotatable planetary gear's projecting portion engage with those of another fixed planetary pinion which is secured to the rotary sleeve. In this manner the adjusting bracket may be set with high accuracy for the smallest distances.

In the operation of V-belt pulley variable drives it is desirable to make a subsequent adjustment of a previously preset spacing between the individual drive flange pairs in order to compensate for a possible elongation of the V-belt.

In order to effect this compensation evenly with respect to the median plane of the drive pulley flange pair, there may be advantageously built in a gear, through a maintenance opening in the carrier wall, which, when in a certain set position, may be secured by means of a set screw. This gear may be provided with two toothed flanges. One of these toothed flanges is provided with a thread at the point of the axially displaceable drive flange member. The other gear flange engages with an oppositely threaded member, which acts upon the bearing of the non-rotatable other drive pulley flange. Both gear flanges, together with the member to which they are secured, are thus moved equal distances sideways when the common gear is rotated, whereby both drive flanges are adjusted an equal amount to the right or left relative to an ideal median plane.

When it is desired to bring about the known transfer of rotational moments between the drive pulley flange pairs and their shafts through pressure surfaces which abut against rollers associated with the drive shafts, this transfer is carried out, according to the invention, in such a manner that the same axial pressure is exerted upon the V-belt regardless of the transmission and load ratio with a given peripheral force. For this purpose the following provision may be made.

A lever rod is connected directly or indirectly to at least one of the rotatable but axially non-displaceable drive flanges at two diametrically opposed points. One end of the lever rod is guided in a recess seat of the attached axially displaceable drive flange, while the other end of the lever actuates a swingable stirrup member.

Both swingable stirrups are disposed with their pairs of boss ends perpendicularly to the trunnions arranged at the drive shaft axis the said ends being provided with flat-surfaced broadened portions. These broadened portions, which form a variable angle, each abut rollers which are supported on a ring at diametrically opposed points. This ring, again, is secured to the attached drive shaft at an axis which is perpendicular to the axis of the trunnions so that a gimbal or Cardan's suspension becomes possible. This arrangement results, along with automatic pressure, on the V-belt pulley flanges, depending on the V-belt's rotational moment, in a stress-free drive, independent of the rotational direction of the drive flange pairs.

The above and other important features and objects of the invention will become apparent from the following description when read in connection with the accompanying drawings illustrating a preferred embodiment of the invention. It is to be understood, however, that various changes in the details of the construction may be made without departing from the scope of the invention.

Figure 1:
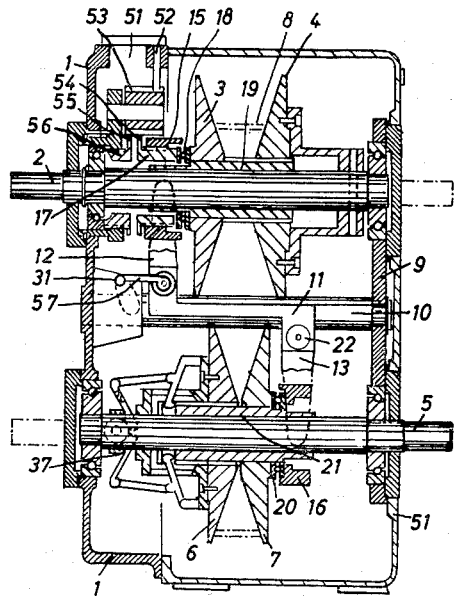
FIG. 1 is a side view in cross-section through the drive in assembled condition, ready for installation.
Figure 2:
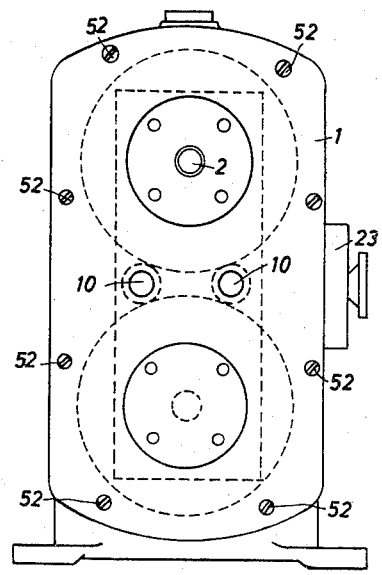
FIG. 2 is a front elevational view of the device.
Figure 3:
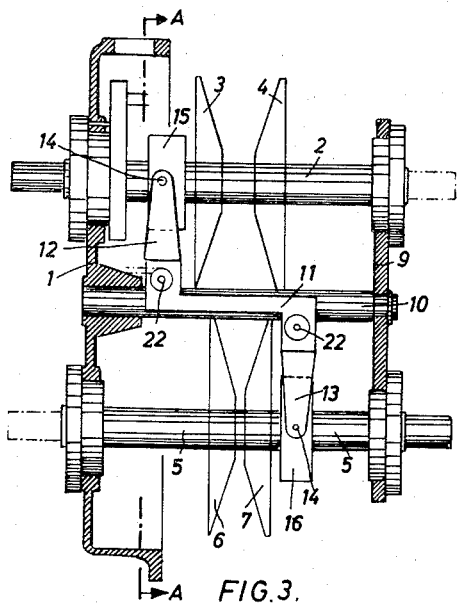
FIG. 3 is a side view similar to FIG. 1, but with some parts omitted.
Figure 4:
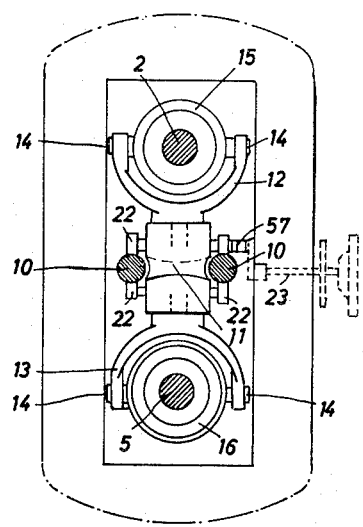
FIG. 4 is a sectional view taken on line A—A of FIG. 3.

In FIGS. 1–4 the numeral 1 indicates the pan-like carrier wall which supports all the drive parts. It includes the driving shaft 2 with the drive pulley pair 3 and 4 seated thereon, the driven shaft 5 with its V-belt pulley pair 6 and 7 and a suitable structure for the V-belt which serves to transmit the power between the drive pulley pairs.

The drive pulley flanges 4 and 6 are positioned fixedly and non-rotatably on their shaft, while the drive flanges 3 and 7 are likewise arranged non-rotatably but axially displaceable on their shaft. These known construction parts are mounted in the carrier wall 1 and plate 9 parallel thereto, respectively. The mutual position and spacing of carrier elements 1 and 9 is secured through a traverse or spacer means consisting of two spacer bars 10 which are disposed in the space enclosed by the V-belt 8.

This traverse or spacer means serves simultaneously as a guide for the movable dog or bracket 11 by means of which is effected the axial movement of drive sheaves 3 and 7 relative to the drive sheaves 4 and 6. For this purpose there are provided at the carrier body oppositely directed fork brackets 12 and 13, on the shafts 14 of which are borne swingable ring members 15 and 16. The ring member 15 is connected by means of a right hand thread with the bushing 17 for the thrust bearing 18 and is thereby capable to act upon sleeve 19 on which is rigidly secured drive flange 3. The drive flange 3 thereby follows the movement of the ring body 15 and changes its position relative to the fixed drive sheave 4.

The ring member 16 is disposed over shaft bearing 20 of the drive flange 7 which is diagonal to drive flange 3. Drive flange 7 is keyed to bushing 21 and follows each changed position into which drive sheave 3 is axially displaced in the same sense and for the same distance, while drive flange 6 remains fixed. Rollers 22, on which movable dog 11 is guided, serve to facilitate the moving operation.

Figure 6:
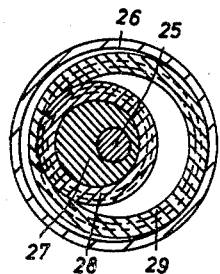
FIG. 6 is a cross-section taken on line B—B of FIG. 5.
Figure 7:
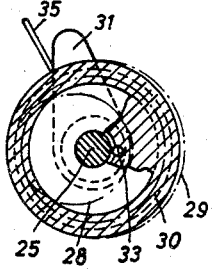
FIG. 7 is a cross-section taken on line C—C of FIG. 5.
Figure 5:
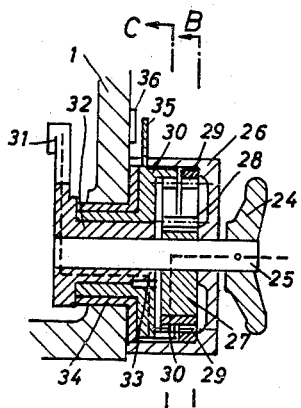
FIG. 5 is a longitudinal section through the adjustment device for the shiftable dog.
Figure 8:
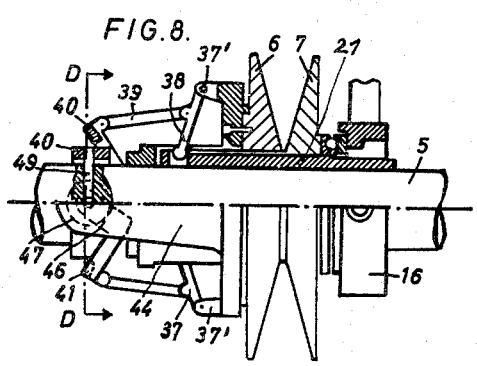
FIG. 8 is a view, partly in elevation and partly in section, of the device employed for the automatic application of pressure on the V-belt pulley flanges in dependence on the V-belt's peripheral force.
Figure 9:
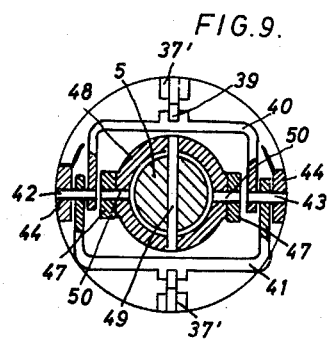
FIG. 9 is a cross-section view taken on line D—D of FIG. 8.
Figure 10:
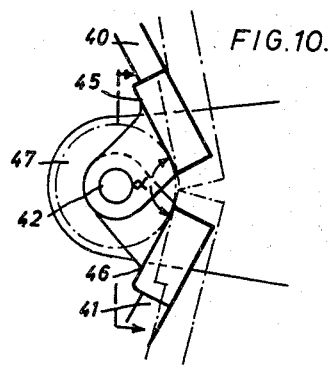
FIG. 10 is an enlarged detail of the device.
Figure 11:
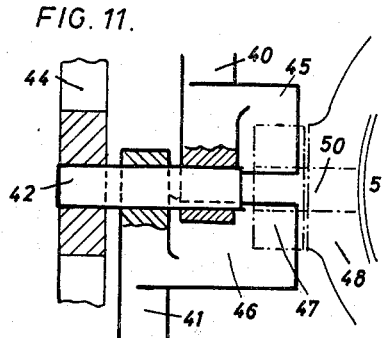
FIG. 11 is another enlarged detail of the device.

The mechanism which is employed for displacing the movable dog 11 and by which the transmission ratio between the two drive pulley flange pairs is altered stepwise is illustrated in FIGS. 1–4, at 23. FIGS. 5, 6 and 7 illustrate the details of this mechanism. The control part 24 projects outwardly of the side of carrier wall 1 and comprises an adjusting knob. This knob is secured to a rotatable shaft 25 which is mounted in a housing 26 secured to the carrier wall. There is further secured on rotatable shaft 25 an eccentric disk 27, on the outer surface of which there is mounted freely a ring gear 28. As the adjusting knob 24, and thereby the shaft 25, are rotated, the ring gear 28 rolls over the ring gear 29 which is rigidly secured to the housing 26. Simultaneously, ring gear 28 engages another ring gear 30 which is disposed behind and parallel to ring gear 29 and serves to adjust adjustable dog 11. In addition, the second ring gear 30 is secured to the bushing 32 by means of key 33, the bushing bearing the adjusting lever 31, which is in locking engagement with adjustable dog 11 by means of link 57, whereby the rotational movements of the shaft 25 or its adjusting knob 24 are transmitted to the adjusting dog. The bushing with the adjustable lever is rotatably guided in the bearing 34 seated in the carrier wall. In the illustrated embodiment the ring gear 29 is provided with 36 teeth. The ring gear 30 has 35 teeth. Through this arrangement there is effected an exceptionally delicate adjustment permitting the least displacement of the adjustable dog 11, because with one turn of the adjusting knob 24, the adjustable lever 31 is moved only the width of one tooth in the direction of the drive shaft axes. An indicator 35 secured to the ring gear 30 permits the reading of the adjustable displacement on a scale 36 of the rear carrier wall 1. The path of movement from the adjusting knob 24 to adjusting lever 31 is indicated by a dotted line in FIG. 5.

The mechanism for transferring the torsional moments between drive pulley flange pair 6 and 7 and the driven shaft 5 is generally indicated by the numeral 37. FIGS. 8–11 illustrate the mechanism's details. The same mechanism may also be provided at drive pulley flange pair 3 and 4. A lever link is secured at each of two diametrically opposed points 37' to the driven pulley flange 6 which is fixedly and non-rotatably secured to driven shaft 5. One end of each link, 38, is guided in a recess in the shiftable sleeve 21 with which the axially displaceable drive flange 7 follows the adjusting movement of the adjusting dog 11 and part 16. Secured to both links 38, respectively, by means of links 39, are swingable stirrups 40 and 41, the boss-shaped ends of which are rotatably mounted, as adjacent pairs on trunnions 42 and 43 which are disposed at right angles to the axis of driven shaft 5. The trunnions 42 and 43 are fixedly mounted on a support 44 which is secured to drive pulley flange 6. The boss-shaped ends of the swingable stirrups 40 and 41 are formed with flat surfaced broadened portions 45 and 46, which are shown on an enlarged scale in FIG. 11. Similar enlargements are also present at stirrups 40 and 41 in FIG. 9. These broadened portions 45 and 46 form a variable angle (FIG. 10) and abut with their surfaces the two rollers 47, which transfer, through the links, the increased peripheral force from the endless belt 8 to the driven pulley pair 6 and 7 and to the driven shaft 5. In addition, both of the rollers 47 are secured to a ring 48, at stations 50 aligned with trunnions 42 and 43, said ring being connected to the driven shaft 5 by means of a trunnion 49 which is perpendicular to the ring. The slanting position of the swinging stirrups 40 and 41 and thereby of the angle enclosed by the surfaces 45 and 46 abutting the rollers 47 is set according to the particular spacing of drive pulley flanges 6 and 7 without thereby occasioning a change in the force transferred to the rollers 47. This is dependent solely on the amount of the increased peripheral torque of pulley 3 and is independent of the set transfer ratio between the drive flange pairs.

The above described mechanism is used to operatively connect the pulley flange 6 to shaft 5.

The represented construction, as shown in FIG. 1 is completed as an enclosed oil-tight unit by means of a housing 51 between carrier wall 1 and and the plate 9, and may be attached to a desired machine with or without this complement, without any further complications. For this purpose it is only necessary to connect the right stub of the driven shaft 5 with the drive shaft of such a machine, for example, by means of a sleeve and then perhaps provide the connection to the machine frame by means of screws 52 shown in FIG. 2.

To adjust the mutual spacing of a drive pulley flange pair, in this case the parts 3 and 4, in the same direction relative to the middle plane there is employed, as shown in FIG. 1, a gear 53, accessible from without through service opening 51. The displacement of the gear may be arrested by means of screw 52. Gear 53 meshes with a pair of toothed flanges 54 and 55. The toothed flange 54 is fixedly mounted on the bushing 17, on which is positioned the right-end threaded ring member 15, so that toothed flange 54 acts upon the drive flange 3. The toothed flange 55 is mounted on a ring 56 which is displaceable by means of a left-handed thread relative to a fixed support and thereby displaces drive shaft 2 with its rigidly mounted drive flange 4. When gear 53 is rotated, the toothed flanges 54 and 55 follow and move each of the drive flanges 3 and 4 exactly the same distances towards or away from each other.

I claim:

1. A V-belt pulley infinitely variable transmission freely detachable unit comprising a driving shaft, a driven shaft spaced parallel to said driving shaft, a pair of V-belt pulleys mounted on each of said shafts respectively, each of said pulleys comprising a pair of cone-shaped flanges, one flange of each pair being fixedly secured to its respective shaft, the other flange of each pair being displaceable axialfly but non-rotatably on said respective shaft, a V-belt arranged to travel over the pulleys and defining a periphery, means for altering the relative rate of revolution of said pulleys, bearing members for said shafts, a housing for said transmission unit, one wall of which supports the bearing members for one end of each of said shafts, a support plate spaced parallelly from said wall for supporting the bearing members for the other ends of said shafts, traverse means between said wall and said plate, said traverse means being disposed within said periphery of the V-belt, the axially displaceable flange of each pulley being opposite the fixed flange of the other pulley, said traverse means comprising a pair of parallel spaced rods extending in the axial direction of said shafts and an adjustable dog operatively engaged with said axially displaceable flanges on and between said rods for the simultaneous adjustment of said axially displaceable flanges, relative to said fixed flanges and control means mounted exteriorly of said housing, engaging said dog for displacing the latter, said control means having an axis transverse to the axes of said shafts.

2. The device according to claim 1, wherein said control means comprises a vernier gear mechanism mounted on said housing, a rockable lever operatively connected to said vernier gear mechanism and said dog, a control shaft having one end secured to said vernier gear mechanism and another end connected to a knob.

3. The device according to claim 2, wherein said vernier gear mechanism comprises a vernier housing, a first internal ring gear fixedly secured in said vernier housing, a second, rotatable internal ring gear in said vernier housing, both said internal gears being axially aligned with said control shaft, an externally toothed gear operatively mounted on said control shaft and engaging both said gears, said rockable lever being secured to said second ring gear, the number of teeth of said second gear being $Z = Z_1 - 1$, where $Z_1$ is the number of teeth of said first gear.

4. The device according to claim 1, wherein said dog includes a fork bracket extending perpendicularly and in opposite directions from each end of said dog, a ring member operatively secured to each of said fork brackets, a thrust bearing on each of the respective shafts engaging said ring member and abutting the respective displaceable flanges, whereby said flanges follow the movement of said ring members.

References Cited in the file of this patent

UNITED STATES PATENTS

| | | |
|---|---|---|
| 2,021,136 | Reeves | Nov. 19, 1935 |
| 2,378,375 | Abbott | June 19, 1945 |
| 2,735,308 | Peterson | Feb. 21, 1956 |
| 2,769,345 | Bugenhagen | Nov. 6, 1956 |

FOREIGN PATENTS

| | | |
|---|---|---|
| 543,918 | France | June 12, 1922 |
| 136,432 | Australia | Feb. 21, 1950 |